United States Patent [19]

Akiyama

[11] Patent Number: 5,012,402
[45] Date of Patent: Apr. 30, 1991

[54] SYSTEM FOR MODIFYING A MACHINE'S PROGRAM AT A REMOTE LOCATION

[75] Inventor: Yasuo Akiyama, Kyoto, Japan

[73] Assignee: Murata Kikai Kabushiki Kaisha, Kyoto, Japan

[21] Appl. No.: 285,508

[22] Filed: Dec. 16, 1988

[30] Foreign Application Priority Data

Dec. 17, 1987 [JP] Japan ................................. 62-317478

[51] Int. Cl.⁵ ............................................... G06F 15/46
[52] U.S. Cl. .................................... 364/192; 364/138; 364/474.11; 340/825.23
[58] Field of Search ................... 364/138, 192, 474.11, 364/132, 200, 900, 300; 340/825.06, 825.22, 825.23, 825.29

[56] References Cited

U.S. PATENT DOCUMENTS

| | | | |
|---|---|---|---|
| 4,390,953 | 6/1983 | Johnstone | 364/474 |
| 4,531,182 | 7/1985 | Hyatt | 364/131 |
| 4,626,984 | 12/1986 | Unruh et al. | 364/132 |
| 4,835,699 | 5/1989 | Mallard | 364/470 |

Primary Examiner—Clark A. Jablon
Assistant Examiner—Paul Gordon
Attorney, Agent, or Firm—Spensley, Horn, Jubas & Lubitz

[57] ABSTRACT

A system for controlling a machine at a remote place is constituted such that, when repairs and a change of a mechanical part of an apparatus on the remote place side are performed and changing of a program for a programmable sequencers for driving and controlling the apparatus is performed, contents of a change of the program thus performed are sent to a computer on the main office side and checked and changed on the main office side to make a correct program, and the correct program is sent to the controlling device on the remote place side.

5 Claims, 1 Drawing Sheet

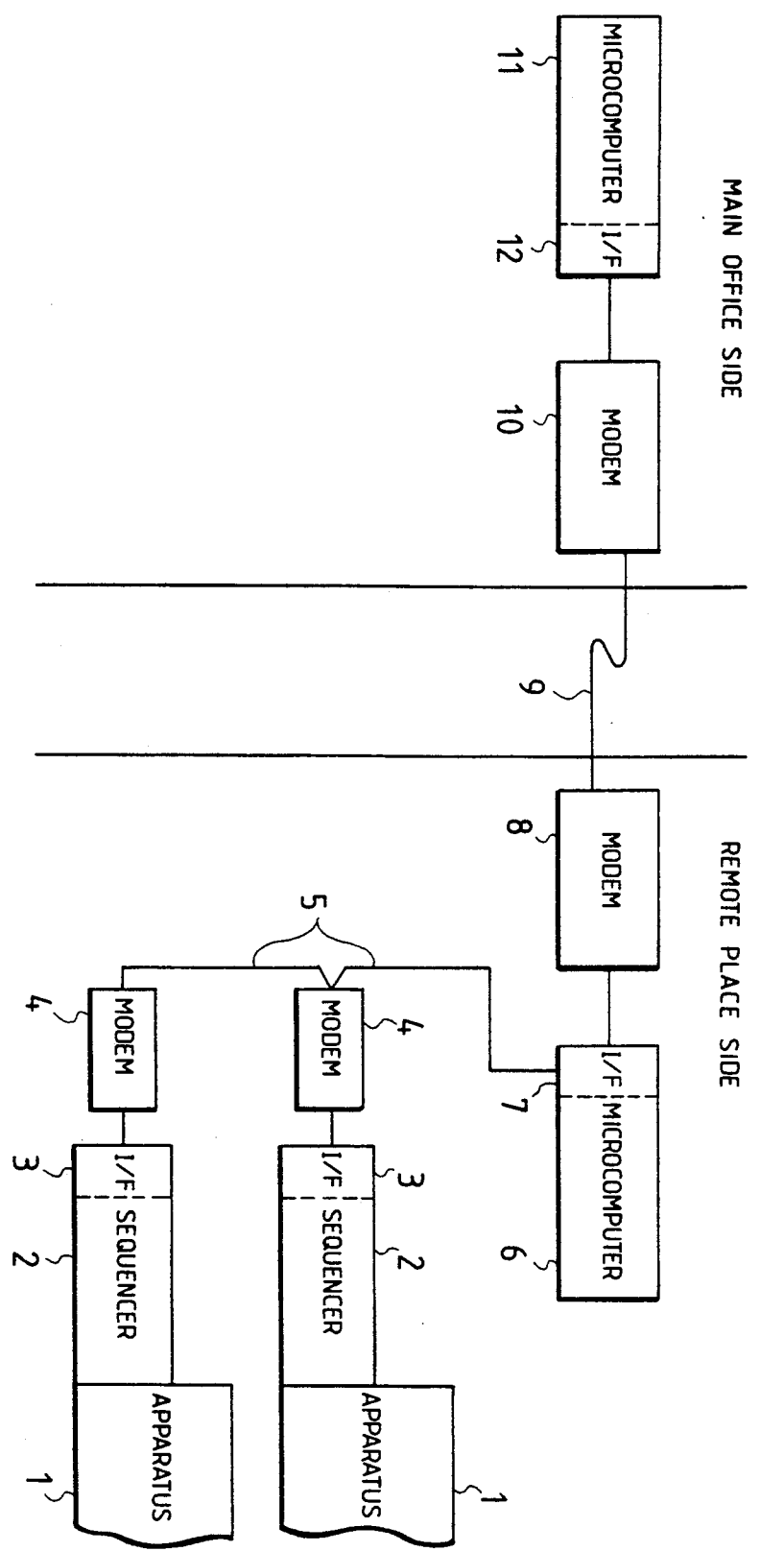

SYSTEM FOR MODIFYING A MACHINE'S PROGRAM AT A REMOTE LOCATION

FIELD OF THE INVENTION

This invention relates to a system for controlling a machine at a remote place which enables, when repairs and/or a change of a mechanical part of an apparatus on the remote place side are performed, a changed program for a control device for driving and controlling the apparatus to be checked on a main office side.

RELATED ART STATEMENT

Conventionally, in a case in which trouble takes place or a change is caused on an apparatus at a first location (referred to herein as a remote place or as a remote place side, such as a branch office side), a mechanical engineer at a second location (referred to herein as a main office side) makes a business trip to the remote place side and repairs, changes or checks a mechanical part of the apparatus, but in this instance, it is necessary to also change contents of a program for a control device for driving and controlling the apparatus.

In this instance, while the mechanical engineer re-enters contents of the program, the thus re-entered contents are transmitted to an engineer on the main office side by telephone communication in order to confirm whether they have been changed correctly.

However, it is difficult to grasp, by telephone, whether the communication of the re-entered contents has been transmitted correctly to the companion, and as a result, the apparatus may not operate properly or several telephone communications may be required. Accordingly, there is a problem that it involves much waste in time and cost.

OBJECT AND SUMMARY OF THE INVENTION

It is an object of the present invention to provide a system for controlling a machine at a remote place by which, when a program for an apparatus on the remote place side is to be changed after the apparatus has been repaired and/or changed, such changing can be effected accurately and readily.

In order to attain the object described above, according to the present invention, a system for controlling a machine at a remote place is constituted such that, when repairs and/or a change of a mechanical part of an apparatus on the remote place side are performed and changing of a program for a controlling device for driving and controlling the apparatus is performed, contents of a change of the program thus performed are sent to a computer on the main office side over a public telephone circuit and checked and/or changed on the main office side to make a correct program, and the correct program is sent to the controlling device on the remote place side, over the public telephone circuit and inputted to the controlling device.

With the construction described above, when a change of a program for a control device for an apparatus on the remote place side such as a branch office side is to be re-entered after repairs and/or a change of a mechanical part of the apparatus, contents of the program are transmitted to a computer on the main office side making use of a public telephone circuit so that an engineer on the main office side can correctly check the contents of the program. Further, by sending the proper program to the control device on the remote place side making use of the public telephone circuit again, the changed program can be accurately and readily inputted to the control device.

BRIEF DESCRIPTION OF THE DRAWING

The accompanying drawing is a block diagram showing an embodiment of the present invention.

DETAILED DESCRIPTION OF PREFERRED EMBODIMENT

In the following, a preferred embodiment of the present invention will be described with reference to the accompanying drawings.

In the accompanying drawings, reference numeral 1 denotes an apparatus at a first location or on the remote place side, such as a branch office side, and each of the apparatus 1 is driven and controlled by a control device (sequencer) 2. The control device 2 is designed to receive information from various sensors (not shown) of the apparatus 1 and control various appliances in the apparatus 1, and contents of control thereof can be programmed by operation of a keyboard (not shown) suitably provided on the control device 2.

When the apparatus 1 gets out of order or the specifications thereof are to be partially changed, if it is assumed that an engineer at a second location or on the main office side which has produced the apparatus 1 makes a business trip to the remote place side and exchanges or additionally mounts a mechanical part or the like in the apparatus 1 to effect repairs and/or a change of the apparatus 1, it is necessary to partly change contents of a program for the control device 2 with such repairs and/or a change.

This will be described further.

At first, a MODEM (modulator and demodulator) 4 is connected to each of the control devices 2 by way of a communication interface 3, and the MODEM 4 is connected to a communication interface 7 of a microcomputer 6 on the remote place side by way of a telephone line 5 in a factory or building on the remote place side.

The communication interface 7 is connected by way of another MODEM 8 and over a public telephone circuit 9 to a further MODEM 10 on the main office side and further to a communication interface 12 of a microcomputer 11 on the main office side.

With the construction, when contents of a program for a control device 2 are to be changed after repairs and/or a change of the apparatus 1, at first the contents of the re-entered program are modulated by the MODEM 4 via the communication interface 3 to transmit the contents of the program from the MODEM 4 to input them to the microcomputer 6 on the remote place side by way of the interface 7. Further, the contents of the program inputted to the microcomputer 6 are recalled on the main office side by way of the MODEM 8 and over the public telephone circuit 9, and the contents of the program are transmitted to the microcomputer 11 by way of the MODEM 10 on the main office side.

If the contents of the program after it has been changed are transmitted to the microcomputer 11 on the main office side in this manner, an engineer on the main office side checks if the contents of the program are proper, and if the contents of the program are proper, then they are left as they are, but if the contents of the program are not proper, then they are amended correctly. Then, the proper program which may have been changed is transmitted from the MODEM 10 to the microcomputer 6 on the remote place side over the public telephone circuit 9. The thus transmitted changed program is transmitted from the microcomputer 6 on the remote place side to every location on the remote place side over the line 5 so that it is then demodulated at the MODEM 4 and sent to the control device 2 by way of the communication interface 3.

The changed program sent to the control device 2 is inputted, and trial operation of the apparatus 1 is performed in accordance with the changed program to examine if the apparatus 1 operates properly. Then, if the operation proceeds properly, the repairs and/or change are completed. If the operation should not proceed properly, the mechanical part would be checked again, and then if the apparatus 1 operates properly only by changing of the part, then the repairs and/or change are completed.

To the contrary, if a change of the program becomes necessary again, then the operations described above will be performed again.

As described so far, according to the present invention, the following good effects are exhibited.

(1) When an apparatus on the remote place side is repaired and/or changed and a program for a control device for the apparatus is changed, the changed program is transmitted directly to the main office side over a public telephone circuit to check if it is proper. Accordingly, it becomes possible to input the program accurately.

(2) Since the changed program is transmitted directly over the public telephone circuit, the necessity of having several conversations by telephone as in a conventional system is eliminated, and waste is eliminated.

What is claimed is:

1. A system for controlling a machine at a remote place, characterized in that, when repairs and/or a change of a mechanical part of an apparatus having a programmable sequencer for driving and controlling the apparatus on the remote place side are performed and a change of a program for the sequencer is performed, contents of a change of the program thus performed are sent to a computer on a main office side over a public telephone circuit and checked and/or changed on the main office side to make a correct program, and the correct program is sent to said controlling device on the remote place side over the public telephone circuit and inputted to said controlling device.

2. A method for controlling a device at a first location, the method comprising the steps of:
providing a programmable sequencer for driving and controlling the device,
performing a modification of the device at the first location,
performing a modification of the program for the programmable sequencer at the first location to thereby produce a modified program,
sending contents of the modified program to a computer at a second location,
checking and correcting contents of the modified program at the second location to thereby produce a corrected program,
sending the corrected program to the sequencer at the first location, and
inputting the corrected program to the sequencer at the first location.

3. A method for controlling a device at a first location, the method comprising the steps of:
providing a programmable sequencer for driving and controlling the device,
performing a modification of the device at the first location,
performing a modification of the program for the programmable sequencer at the first location to thereby produce a modified program,
sending contents of the modified program via telephone to a computer at a second location,
checking and correcting contents of the modified program at the second location to thereby produce a corrected program,
sending the corrected program via telephone to the sequencer at the first location, and
inputting the corrected program to the sequencer at the first location.

4. An apparatus for controlling a device at a first location, the apparatus comprising:
a programmable sequencer for driving and controlling the device,
modification means for performing a modification of the program for the programmable sequencer at the first location to thereby produce a modified program,
transmission means for sending contents of the modified program to a computer at a second location,
correction means for checking and correcting contents of the modified program at the second location to thereby produce a corrected program,
transmission means for sending the corrected program to the sequencer at the first location, and
input means for inputting the corrected program to the sequencer at the first location.

5. An apparatus for controlling a device at a first location, the apparatus comprising:
a programmable sequencer for driving and controlling the device,
modification means of performing a modification of the program for the programmable sequencer at the first location at the first location to thereby produce a modified program,
transmission means for sending contents of the modified program at the second location to thereby produce a corrected program,
transmission means for sending the corrected program via telephone to the sequencer at the first location, and
input means for inputting the corrected program to the sequencer at the first location.

* * * * *